United States Patent
Brisighella, Jr. et al.

(10) Patent No.: US 7,845,278 B2
(45) Date of Patent: Dec. 7, 2010

(54) PYROTECHNIC CUP

(75) Inventors: Dario G. Brisighella, Jr., North Logan, UT (US); Mike Ayers, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 6 days.

(21) Appl. No.: 12/008,793

(22) Filed: Jan. 14, 2008

(65) Prior Publication Data

US 2009/0179408 A1    Jul. 16, 2009

(51) Int. Cl.
  *F42B 3/04*        (2006.01)
  *B60R 21/264*   (2006.01)
  *C06D 5/00*       (2006.01)

(52) U.S. Cl. ............... 102/202.5; 102/202.11; 102/531; 280/741

(58) Field of Classification Search ............ 102/202.5, 102/202.7, 202.8, 202.9, 202.11, 202.12, 102/202.14, 204, 530, 531; 280/741
See application file for complete search history.

(56) References Cited

U.S. PATENT DOCUMENTS

| | | | | |
|---|---|---|---|---|
| RE18,837 E | * | 5/1933 | Rolland | 102/202.11 |
| 3,106,131 A | * | 10/1963 | Barr et al. | 89/1.14 |
| 4,068,862 A | * | 1/1978 | Ishi et al. | 280/740 |
| 5,140,906 A | | 8/1992 | Little, II | |
| 5,346,251 A | | 9/1994 | Burnard et al. | |
| 5,913,537 A | * | 6/1999 | Goetz | 280/741 |
| 5,951,042 A | * | 9/1999 | O'Loughlin et al. | 280/741 |
| 6,012,737 A | * | 1/2000 | Van Wynsberghe et al. | 280/737 |
| 6,120,058 A | * | 9/2000 | Mangum et al. | 280/741 |
| 6,168,202 B1 | * | 1/2001 | Stevens | 280/737 |
| 6,302,023 B1 | | 10/2001 | Wier | |
| 6,454,306 B1 | * | 9/2002 | Cunningham et al. | 280/806 |
| 6,709,012 B1 | * | 3/2004 | Tanaka et al. | 280/736 |
| 6,823,796 B1 | | 11/2004 | Amano | |
| 6,941,868 B2 | | 9/2005 | Herget | |
| 6,979,021 B2 | | 12/2005 | Young et al. | |
| 7,188,567 B1 | | 3/2007 | Italiane et al. | |
| 2002/0174792 A1 | | 11/2002 | Kubozuka et al. | |
| 2003/0137135 A1 | | 7/2003 | Welz | |
| 2004/0107856 A1 | * | 6/2004 | Hennings et al. | 102/202.7 |
| 2004/0201208 A1 | * | 10/2004 | Longhurst et al. | 280/741 |
| 2005/0126417 A1 | * | 6/2005 | Parker et al. | 102/202.12 |
| 2005/0183606 A1 | * | 8/2005 | Kubo et al. | 102/202.12 |
| 2006/0061077 A1 | | 3/2006 | Hansen | |
| 2006/0137559 A1 | * | 6/2006 | Mavrakis et al. | 102/202.12 |
| 2007/0095236 A1 | * | 5/2007 | Maruyama et al. | 102/202.9 |
| 2007/0257476 A1 | * | 11/2007 | Green et al. | 280/737 |
| 2007/0261582 A1 | * | 11/2007 | Lahitte et al. | 102/202.5 |

OTHER PUBLICATIONS

U.S. Appl. No. 11/599,149, filed Nov. 14, 2006, Jackson et al.

* cited by examiner

*Primary Examiner*—Bret Hayes
(74) *Attorney, Agent, or Firm*—Sally J Brown; Madson IP, P.C.

(57) ABSTRACT

The pyrotechnic cup is designed such that it may be used as part of an airbag initiator. In some embodiments, the cup comprises a cylindrical portion and a dome that is attached to a first end of the cylindrical portion. A cruciform is also added to the cup. The cruciform is positioned at the apex of the dome. In some embodiments, the cruciform comprises one or more petals. Other embodiments may be designed in which deployment of the initiator causes gas to be directed out of the pyrotechnic cup via the apex of the dome.

19 Claims, 6 Drawing Sheets

PYROTECHNIC CUP

BACKGROUND OF THE INVENTION

Airbags and airbag systems have been implemented and used on motor vehicles for many years as a safety device. These systems are designed such that, in the event of a crash or accident, an airbag will be inflated and positioned adjacent the vehicle occupant. Such positioning of the airbag prevents the vehicle occupant from harmful impact with the steering wheel, the dashboard, or other portions of the vehicle interior. Because airbag systems have been credited with saving many lives, the inclusion of airbag systems on new vehicles is now a requirement in many countries.

In order to deploy the airbag, the airbag system will generally include an inflator. An inflator is a device that is capable of rapidly producing/channeling large quantities of inflation gas into the airbag during deployment. This influx of gas into the airbag inflates the airbag and causes the airbag to become positioned on the vehicle interior.

In order to rapidly deploy the airbag, the inflator will generally include an initiator. The initiator generally includes a combustible material that is ignited upon receipt of the appropriate signal. Such ignition of the combustible material, in turn, creates a pressure change in the inflator and results in deployment of the inflator.

The combustible material found in the initiator is generally housed within a "cup" (which is sometimes called a "pyrotechnic cup"). The cup is generally a wall that surrounds the combustible material. Unfortunately, during ignition/combustion of the combustible material, the pressure change caused by combustion often causes the cup to fragment into small pieces. Obviously, it is undesirable to have fragments of the cup enter the airbag; accordingly, the inflator must be designed to ensure that these fragments are retained within the inflator and not allowed to enter the airbag.

In order to capture fragments produced by ignition, many currently constructed initiators will include a glass to metal seal ("GTMS") header with a laser welded charge holder. This charge holder serves as a pressure vessel that reduces the stress in the cup and prevents the cup from fragmenting. Other inflators also add a cup retention device, such as a screen, to retain fragments of the pyrotechnic cup. Unfortunately, these charge holders and/or cup retention devices increase the cost of the inflator. Accordingly, there is a need in the art for a new type of inflator that does not require charge holders/cup retention devices, yet still prevents cup fragments from entering the airbag. Such a device is disclosed herein.

BRIEF SUMMARY OF THE INVENTION

The present invention embodiments relate to a pyrotechnic cup that may be used as part of an airbag initiator. In some embodiments, the cup comprises a cylindrical portion and a dome that is attached to a first end of the cylindrical portion. A cruciform is also added to the cup. The cruciform is positioned at the apex of the dome. In some embodiments, the cruciform defines one or more petals. Other embodiments may be designed in which deployment of the initiator causes gas to be directed out of the pyrotechnic cup via the apex of the dome.

Further embodiments may be designed in which a top piece is added to the dome. The top piece may be substantially flat. Other shapes and/or configurations for the top piece may also be used. In other embodiments a projection welding flange is added to the cup. The projection welding flange may be positioned at a second end of the cylindrical portion. The diameter of the projection welding flange may be greater than the diameter of the cylindrical portion.

Other embodiments may be designed in which the pyrotechnic cup also includes a crimped bend that expands during deployment of the initiator. This crimped bend may be positioned intermediate of the dome and the projection welding flange. Yet additional embodiments may be designed in which the pyrotechnic cup houses a squib and a quantity of combustible material. In some embodiments, the crimped bend comprises an overlapped portion. The overlapped portion may be formed by folding material either inwardly or outwardly. In some embodiments, the expansion of the cylindrical portion upon actuation of the initiator unfolds the overlapped portion. Such "unfolding" of the overlapped portion may occur, either in whole or in part.

Other embodiments of the present invention relate to an initiator. The initiator may be used with an airbag inflator. In these embodiments, the initiator comprises a squib and a quantity of combustible material. The combustible material may be ignited by the squid during deployment of the initiator. A pyrotechnic cup is also added to the initiator. The cup houses the squib and the combustible material. The cup comprises a cylindrical portion, a dome attached to a first end of the cylindrical portion, a cruciform positioned at the apex of the dome, and a projection welding flange positioned at a second end of the cylindrical portion. The projection welding flange attaches the pyrotechnic cup to the squib.

In some embodiments, the diameter of the projection welding flange is greater than the diameter of the cylindrical portion. In other embodiments, the pyrotechnic cup will further include a crimped bend that expands as a result of ignition of the combustible material, wherein the crimped bend is positioned in the cylindrical portion.

The present embodiments also relate to a method for preventing fragmentation of a pyrotechnic cup in an inflator. The method may include the step of obtaining a pyrotechnic cup. This pyrotechnic cup comprises a cylindrical portion, a dome attached to a first end of the cylindrical portion, and a cruciform positioned at the apex of the dome. The method also includes the step of positioning the cup around a squib and a combustible material. Once positioned, the dome prevents fragmentation of the cup.

The present embodiments relate to a pyrotechnic cup that may be used as part of an initiator. The initiator may then be added to an airbag inflator and used as part of an airbag system. The present pyrotechnic cup is designed such that during deployment, the cup will have minimal or no fragmentation.

The pyrotechnic cup may include a cylindrical portion and a dome. The dome may be positioned at an end of the cylindrical portion. The dome may also have an apex. The dome may further comprise a top piece and a tapered portion. The tapered portion is connected to the cylindrical portion. The tapered portion may be curved and may create a smooth transition from the top piece to the cylindrical portion.

The pyrotechnic cup may also include a cruciform. The cruciform may be added to the apex of the dome. The cruciform may comprise one or more slits or openings in the dome. In further embodiments, the cruciform will comprise a weakened area of the dome. In further embodiments, the cruciform may be added to an outer surface of the dome. Yet additional embodiments may be designed in which the cruciform comprises a weakened area of the dome.

The pyrotechnic cup may further include a projection welding flange. The projection welding flange is a flange, ring or other feature that extends from the cylindrical portion. The projection flange and may be used to attach (via welding, etc.)

the pyrotechnic cup to a squib or other portions of the initiator. The projection welding flange may be positioned at a second end of the cylindrical portion. The diameter of the projection welding flange may be larger than the diameter of the cylindrical portion.

A crimped bend may also be added to the pyrotechnic cup. In some embodiments, the crimped bend is added to the cylindrical portion. In further embodiments, the bend is positioned intermediate of the dome and the welding flange. The crimped bend is a portion or section of cup that has been folded inward, thereby forming an overlapped portion.

The pyrotechnic cup is designed that it may be used in conjunction with an initiator. Upon receipt of a signal indicating a crash condition, the initiator is activated. Such activation causes an electrical charge and/or current to be transmitted, through wires, to a quantity of combustible material housed within the pyrotechnic cup. Such a transmission of current/electrical charge to the combustible material ignites the combustible material forming gas within the cup.

The formation of the gas in the cup increases the pressure within the cup. In turn, the increase in pressure in the cup causes the crimped bend to expand. More specifically, the formation of the gas pushes against the cup and causes the crimped bend to unfold and expand, thereby increasing the length of the pyrotechnic cup.

The presence of the cruciform in the pyrotechnic cup creates a high stress region located proximate the apex of the dome. Accordingly, when the gas has formed, the gas pushes against the cruciform and may, in some embodiments, cause the cruciform to deflect outward (i.e., away from the flange), prior to opening the cruciform. Ultimately however, the pressure created by the gas will open the cruciform and allow the gas to escape the cup by passing through the opening in the dome's apex.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
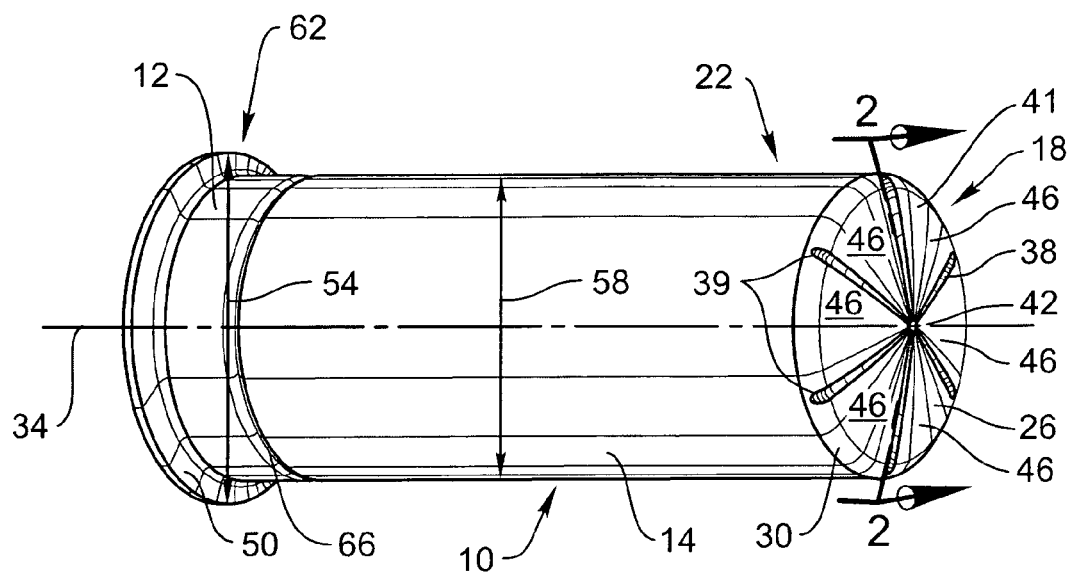
FIG. 1 is a perspective view of a pyrotechnic cup according to the present embodiments.

Referring now to FIG. 1, a perspective view of an embodiment of a pyrotechnic cup 10 is illustrated. This pyrotechnic cup 10 is designed for use with an airbag inflator (not shown in FIG. 1). More specifically, the pyrotechnic cup 10 may be used as part of an initiator assembly 12 that operates to deploy an inflator during a crash or accident. As is explained in greater detail herein, the pyrotechnic cup 10 is designed such that during deployment, the cup 10 will have minimal or no fragmentation. Accordingly, the risk that fragments will form and enter the airbag during deployment is greatly reduced by the use of the pyrotechnic cup 10.

The cup 10 is designed to surround and enclose a squib (not shown in FIG. 1) and a quantity of combustible material (not shown in FIG. 1). In general, upon receipt of the appropriate signal, the combustible material will be ignited and combust within the cup 10.

The cup 10 may include a cylindrical portion 14 and a dome 18. The dome 18 may be positioned at a first end 22 of the cylindrical portion 14. In some embodiments, the cylindrical portion 14 and the dome 18 are made of the same material, such as metal. Other embodiments may be designed in which the cylindrical portion 14 and the dome 18 are made of different materials. In further embodiments, the cylindrical portion 14 is made of a first metal whereas the dome 18 is made of a second metal.

In some embodiments, the cylindrical portion 14 and the dome 18 are two separate elements that have been welded, affixed, press-fit, or otherwise connected together. In other embodiments, the cylindrical portion 14 and the dome 18 are portions of the same, integral member that has been cast or otherwise formed.

In the embodiment shown in FIG. 1, the dome 18 comprises a top piece 26 and a tapered portion 30. The tapered portion 30 is connected to the cylindrical portion 14. In some embodiments, the top piece 26 and the tapered portion 30 are two distinct pieces that have been welded, affixed or otherwise connected together. In other embodiments, the tapered portion 30 and the top piece 26 are sections or portions of the same, integral member.

In the embodiment shown in FIG. 1, the top piece 26 may be flat or substantially flat. This means that the top piece 26 is perpendicular, or substantially perpendicular to a longitudinal axis 34 of the pyrotechnic cup 10. Of course, other embodiments may be constructed in which the top piece 26 is curved or rounded.

The tapered portion 30 will generally be curved and creates a smooth transition from the top piece 30 to the cylindrical portion 14. In some embodiments, the curvature of the tapered portion 30 will be parabolic in shape. In other embodiments, the curvature of the tapered portion 30 may be spherical or radiused in shape. Other shapes and/or configurations for the tapered portion 30 may also be used.

The pyrotechnic cup 10 may also include a cruciform 38. The cruciform 38 may be added to the apex 42 of the dome 18. The cruciform 38 may comprise a weakened area 39 of the dome 18. In some embodiments, this weakened portion 39 may be slits, grooves, depressions, tear seams, or other similar features added to the dome 18. As shown in FIG. 1, the weakened area 39 may be positioned on an outer surface 41 of the dome 18. Other embodiments may also be constructed in which the weakened portion 39 is added to the underside of the dome 18. Other embodiments may also be constructed in which the weakened portion 39 is added to an internal surface of the dome 18. In some embodiments, the weakened area 39 may be designed such that, during actuation, the weakened area 39 will open up into one or more slits or openings in the dome 18.

In the embodiment of FIG. 1, the cruciform 38 defines one or more petals 46. Of course, other shapes and/or configurations for the cruciform 38 may also be used. Further, in the embodiment shown in FIG. 1, a portion of the cruciform 38 is positioned on the top piece 26 whereas a portion of the cruciform 38 is positioned on the tapered portion 30. Other embodiments may also be constructed in which the entirety of the cruciform 38 is positioned on the top piece 26. Still other embodiments may be constructed in which the entirety of the cruciform 38 is positioned on the tapered portion 30.

Referring still to FIG. 1, the pyrotechnic cup 10 may further include a projection welding flange 50. The projection welding flange 50 is a flange, ring or other feature that extends from the cylindrical portion 14 and may be used to attach (via welding, etc.) the pyrotechnic cup 10 to a squib or other portions of the initiator. In the embodiment shown in FIG. 1, the diameter 54 of the projection welding flange 50 is larger than the diameter 58 of the cylindrical portion 14. However, other sizes and/or configurations are also possible.

The projection welding flange 50 may be positioned at a second end 62 of the cylindrical portion 14. Of course, in other embodiments the flange 50 may be positioned along a middle or interior portion of the cylindrical portion 14.

A crimped bend 66 may also be added to the pyrotechnic cup 10. In some embodiments, such as the embodiment shown in FIG. 1, the crimped bend 66 is added to the cylindrical portion 14. However, in other embodiments, the crimped bend 66 may be added to other portions of the pyrotechnic cup 10, including the welding flange 50. In further embodiments, the bend 66 is positioned intermediate of the dome 18 and the welding flange 50. The crimped bend 66 is a portion or section of the cup 10 that has been folded inward, thereby forming an overlapped portion 67 (shown in FIG. 2). As explained herein, this crimped bend 66 may unfold during deployment of the initiator, thereby increasing the longitudinal length of the pyrotechnic cup 10.

As noted above, embodiments may be constructed in which the top piece 26 is flat or substantially flat. In these embodiments, the flat (or substantially flat) region of the top piece 26 constitutes the apex 42 of the dome 18.

Figure 2:
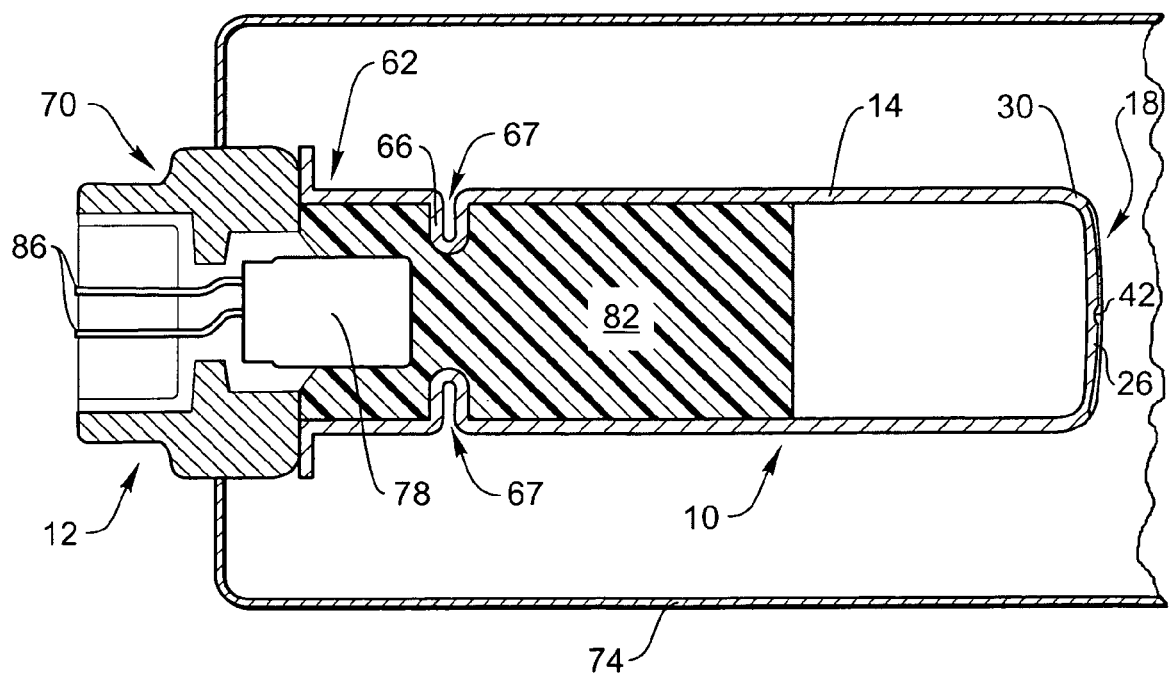
FIG. 2 is a cross-sectional, cut-away view of an inflator that incorporates the pyrotechnic cup of FIG. 1.

Referring now to FIG. 2, a cross-sectional view illustrates the pyrotechnic cup 10 being used as part of an initiator 70. The initiator 70 may be positioned as part of an airbag inflator 74. More specifically, the initiator 70 is designed such that upon receipt of the appropriate signal, the initiator 70 will actuate. Such actuation of the initiator 70 actuates the inflator 74 and causes the inflator 74 to produce/channel a volume of inflation gas into the vehicle airbag (not shown).

The initiator 70 includes a squib 78 and a quantity of combustible material 82. The squib 78 and the combustible material 82 are housed within the pyrotechnic cup 10. The squib 78 also may include one or more wires 86 that are capable of transmitting current and/or an electrical charge to the combustible material 82.

The amount of the combustible material 82 housed within the pyrotechnic cup 10 depends upon a variety of factors including the size of the inflator, the type of the inflator, the amount of pyrotechnic material included in the inflator (if any), etc. As shown in FIG. 2, the cup 10 is substantially filled with combustible material 82. However, greater or lesser amounts of the combustible material 82 may also be used. The selection of the amount of combustible material can be made by those of skill in the art, taking in account a variety of different factors.

Figure 3:
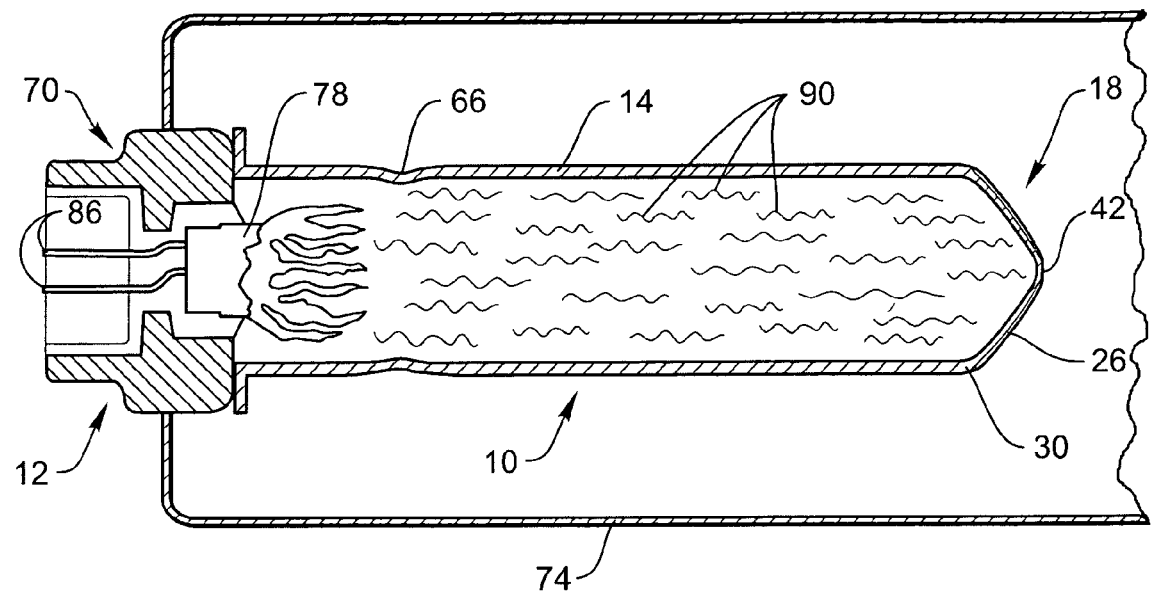
FIG. 3 is a cross-sectional, cut-away view of the inflator of FIG. 2 after the inflator has received a signal indicating a crash condition.

Referring now to FIG. 3, a cross-sectional view illustrates the deployment of the embodiment shown in FIG. 2 in greater detail. Upon receipt of a signal indicating a crash condition, the initiator 70 is activated. Such activation causes an electrical charge and/or current to be transmitted, through the wires 86, to the combustible material 82 (shown in FIG. 2). Such a transmission of current/electrical change to the combustible material 82 ignites the combustible material 86 and forms gas 90. The creation of the gas 90 significantly increases the pressure within the pyrotechnic cup 10.

The increase in pressure in the cup 10 causes the crimped bend 66 to expand. More specifically, the formation of the gas 90 pushes against the cup 10 and causes the crimped bend 66 to unfold and expand, thereby increasing the length of the pyrotechnic cup 10. In those embodiments in which the crimped bend 66 is absent, stress/pressure associated with ignition of the combustible material 82 is directed to the welding flange 50. However, in the embodiments having a crimped bend 66, some of the stress/pressure associated with ignition is used to expand the crimped bend 66, thereby reducing the amount of stress/pressure imposed upon the welding flange 50. Such a reduction in the amount of stress experienced by the welding flange 50 may, in some embodiments, be desirable in that it prevents the cup 10/welding flange 50 from separating from the squib 78 (or other portions of the inflator 74, including the initiator 70).

In some embodiments, the presence of the crimped bend 66 may also create a stress gradient in the pyrotechnic cup 10. More specifically, the fact that the bend 66 may expand and unfold means that there is a greater amount of stress from the ignition/combustion of the material 82 proximate the cruciform 38 than there is proximate the welding flange 50.

Referring still to FIG. 3, the presence of the cruciform 38 in the pyrotechnic cup 10 creates a high stress region located proximate the apex 42 of the dome 18. Accordingly, when the gas 90 has formed, the gas 90 pushes against the cruciform 38 and may, in some embodiments, cause the cruciform 38 to deflect outward (i.e., away from the flange 50), prior to having the cruciform 38 open. Thus, even if the dome 18/top piece 26 is flat or substantially flat prior to deployment, an "apex" of the dome 18 will be formed during deployment.

Figure 4:
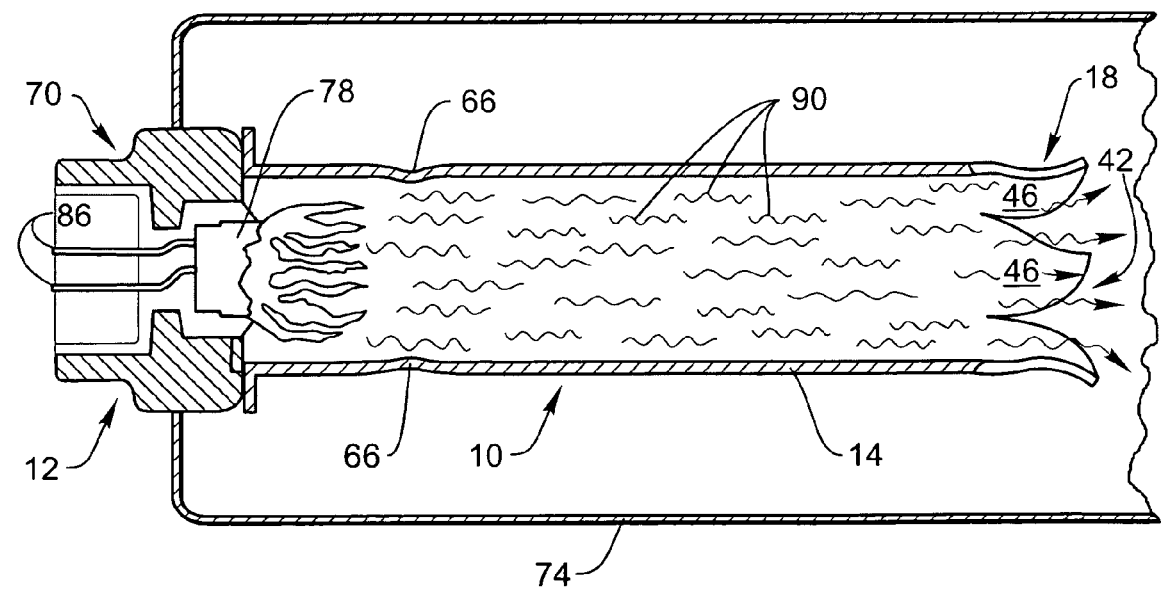
FIG. 4 is a cross-sectional, cut-away view that illustrates the inflator of FIG. 3 after the cruciform of the cup has opened.

Referring now to FIG. 4, another stage of the deployment of the initiator 70 is illustrated. Specifically, after the internal pressure associated with the combustion of the combustible material 82 exceeds a threshold level, the cruciform 38 will open. More specifically, each of the petals 46 opens, thereby creating a passageway in the apex 42 through which the gas 90 may escape into the airbag inflator 74. In turn, this influx of gas 90 into the airbag inflator 74 actuates the inflator 74 (by either igniting a pyrotechnic material in the inflator and/or by increasing the pressure of the inflator 74 above a threshold value). As is known in the art, the actuation of the inflator 74 operates to produce/channel a quantity of inflation gas into the airbag.

Figure 5A:
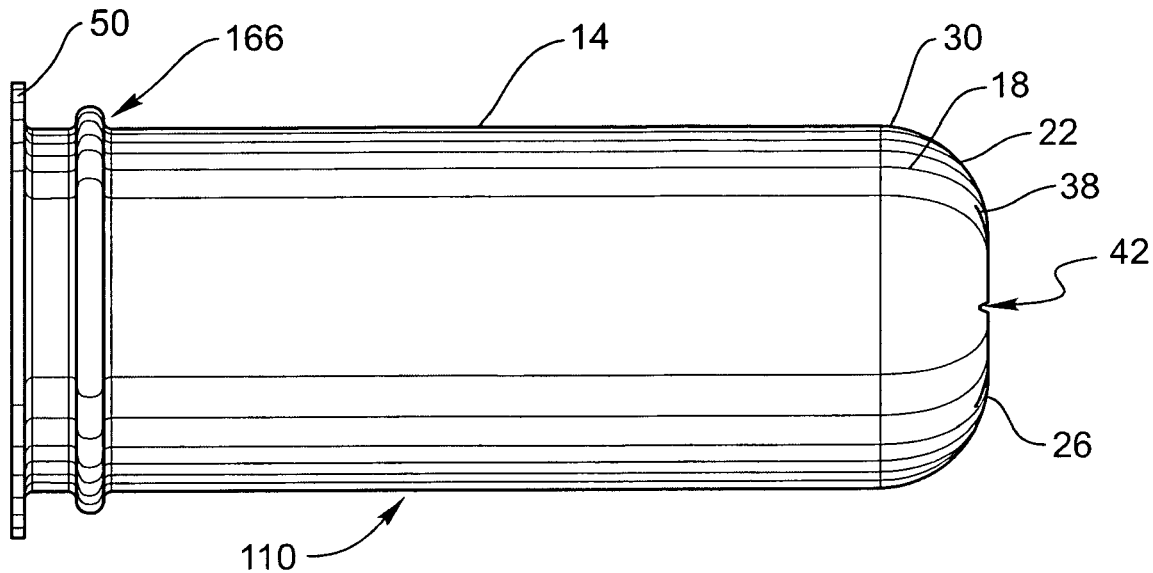
FIG. 5A is a perspective view of another embodiment of a pyrotechnic cup according to the present embodiments.

Referring now to FIG. 5A, a new embodiment of a pyrotechnic cup 110 is illustrated. The cup 110 may be similar and/or identical to the pyrotechnic cup 10 discussed above. However, for purposes of brevity, much of this discussion will not be repeated. The cup 110 may be used in conjunction with an initiator as described above. The cup 110 includes a cylindrical portion 14 and a dome 18. A cruciform 38 may also be added. The cruciform 38 may be positioned at the apex 42 of the dome 18. In some embodiments, this apex 42 of the dome 18 is added to a first end 22 of the cylindrical portion 14.

The cup 110 may be designed such that during deployment, the pyrotechnic cup 110 will have minimal or no fragmentation. Accordingly, the risk that fragments will form and enter the airbag during deployment is greatly reduced by the use of the pyrotechnic cup 110.

In some embodiments, the dome 18 comprises a top piece 26 and a tapered portion 30. The tapered portion 30 is connected to the cylindrical portion 14. In the embodiment of FIG. 5A, the tapered portion 30 and the top piece 26 are sections or portions of the same, integral member.

A projection welding flange 50 may also be added to the pyrotechnic cup 110. The welding flange 50 may be used to attach the pyrotechnic cup 110 to a squib or other portions of the initiator. In the embodiment of FIG. 5A, the diameter of the projection welding flange 50 is larger than the diameter of the cylindrical portion 14. However, other sizes and/or configurations for the welding flange 50 are also possible.

As with the embodiment discussed above, the cup 110 may include a crimped bend 166. This crimped bend 166 is shown in greater detail in FIG. 5B (which is a cross-sectional view of FIG. 5A). The crimped bend 166 may be formed by folding the cylindrical portion 14 (or other portion of the cup 110) outward, thereby creating an overlapped portion 167. (As noted above, the crimped bend 66 discussed above may be formed by folding the cylindrical portion 14 inward.) In some embodiments, the crimped bend 166 may fold or expand during deployment of the initiator, thereby increasing the longitudinal length of the cup 110.

Figure 5B:
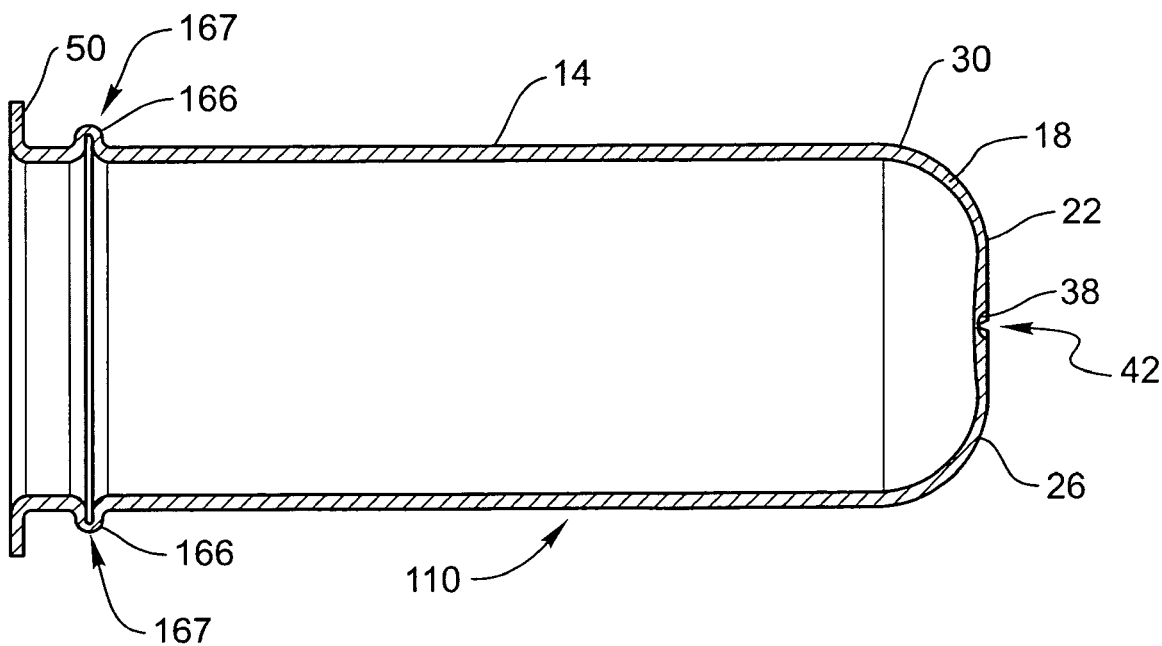
FIG. 5B is a cross-sectional view of the embodiment of FIG. 5A.

In the embodiment shown in FIGS. 5A and 5B, the bend 166 is positioned proximate the welding flange 50. Of course, other positions for the bend 166 along the length of the cup 110 may also be used.

In other embodiments, one or more grooves may be used in conjunction with the crimped bend 166 (or the crimped bend 66). These grooves are indentations that are positioned on the cylindrical portion 14. During deployment, such grooves may expand to increase the longitudinal length of the cup. In further embodiments, the grooves may be used in lieu of the crimped bend 166 (or crimped bend 66).

During deployment of the initiator, the pressure within the cup 110 increases and causes the crimped bend 166 to expand. More specifically, the formation of the gas 90 (not shown in FIG. 5B) pushes against the cup 110 and causes the crimped bend 166 to unfold and expand, thereby increasing the length of the pyrotechnic cup 110. In those embodiments in which the crimped bend 166 is absent, stress/pressure associated with ignition s directed to the welding flange 50. However, in the embodiments having a crimped bend 166, some of the stress/pressure associated with ignition is used to expand the crimped bend 166, thereby reducing the amount of stress/pressure imposed upon the welding flange 50. Such a reduction in the amount of stress experienced by the welding flange 50 may, in some embodiments, be desirable in that it prevents the cup 110/welding flange 50 from separating. In some embodiments, the presence of the crimped bend 166 may also create a stress gradient in the pyrotechnic cup 110. More specifically, the fact that the bend 166 may expand and unfold means that there is a greater amount of stress from the ignition/combustion proximate the cruciform 38 than there is proximate the welding flange 50.

Figure 6:
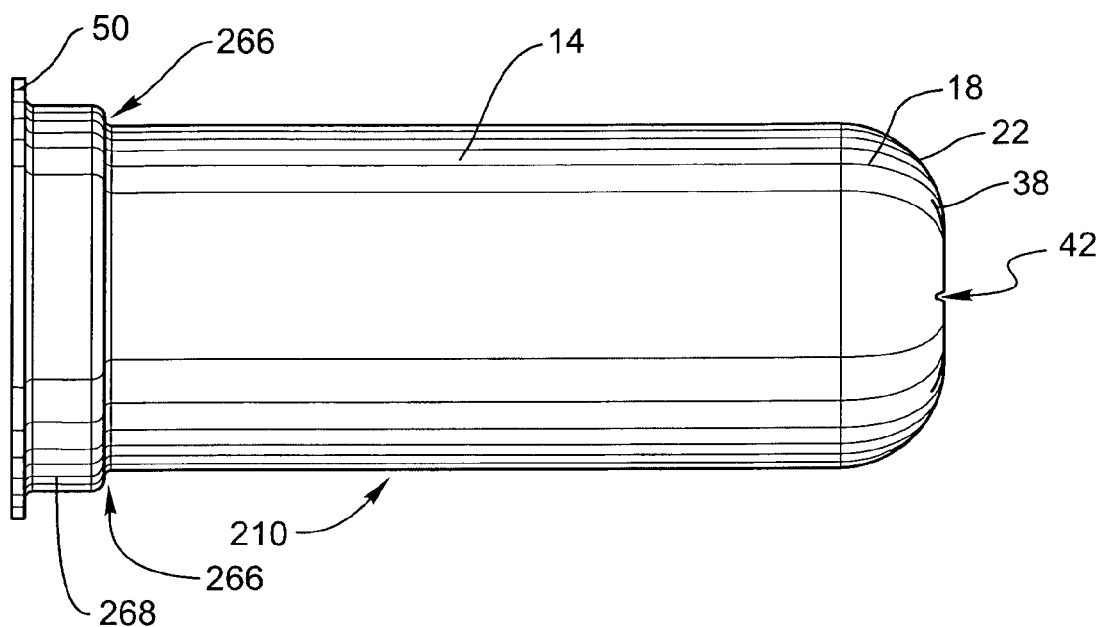
FIG. 6 is a perspective view of another embodiment of a pyrotechnic cup according to the present embodiments.

Referring now to FIG. 6, a further embodiment of a pyrotechnic cup 210 is illustrated. The pyrotechnic cup 210 is similar and/or identical to the embodiments discussed above. The cup 210 may be used in conjunction with an initiator as described above and may create minimal or no fragmentation. The cup 210 includes a cylindrical portion 14 and a dome 18. A cruciform 38 may also be added. The cruciform 38 may be positioned at the apex 42 of the dome 18. In some embodiments, this apex 42 of the dome 18 is added to a first end 22 of the cylindrical portion 14.

The embodiment of the cup 210 of FIG. 6 may also include a crimped bend 266. The bend 266 may be designed to expand and/or unfold during deployment of the initiator. Such expansion of the bend 266 increases the longitudinal length of the cup 210. In the embodiment of FIG. 6, the bend 266 may comprise one or more grooves, depressions, or other similar features. These features may be positioned, all or in part, behind a base 268. By positioning the bend 266 behind the base 268, the cup 210 will telescope out when the initiator deploys and the cup 210 expands in length. Of course, in other embodiments, the bend 266 may comprise an overlapped portion that is formed by folding the cylindrical portion 14 (as shown above). In further embodiments, the bend 266 may be configured differently and/or may be positioned in a manner similar to that which is shown in the embodiments above.

During deployment of the initiator, the pressure within the cup 210 increases and causes the crimped bend 266 to expand. More specifically, the formation of the gas 90 (not shown in FIG. 6) pushes against the cup 210 and causes the crimped bend 266 to unfold and expand, thereby increasing the length of the pyrotechnic cup 210. Some of the stress/pressure associated with ignition is used to expand the crimped bend 266, thereby reducing the amount of stress/pressure imposed upon the welding flange 50. Such a reduction in the amount of stress experienced by the welding flange 50 may, in some embodiments, be desirable in that it prevents the cup 210/welding flange 50 from separating. In some embodiments, the presence of the crimped bend 266 may also create a stress gradient in the pyrotechnic cup 210. More specifically, the fact that the bend 266 may expand and unfold means that there is a greater amount of stress from the ignition/combustion proximate the cruciform 38 than there is proximate the welding flange 50.

The embodiments of FIGS. 5A, 5B, and 6 may further be used in conjunction with the initiator assembly 12 that was described above. Further, the embodiments of FIGS. 5A, 5B, and 6 may also be used in conjunction with an initiator 70, a squib 78, and/or combustible material (all of which are shown in FIG. 2) in the manner described above. Many of the features and/or elements discussed above in conjunction with FIGS. 1-4 may additionally be added to and/or used in conjunction with the embodiments of FIGS. 5A, 5B, and 6.

Figure 7:
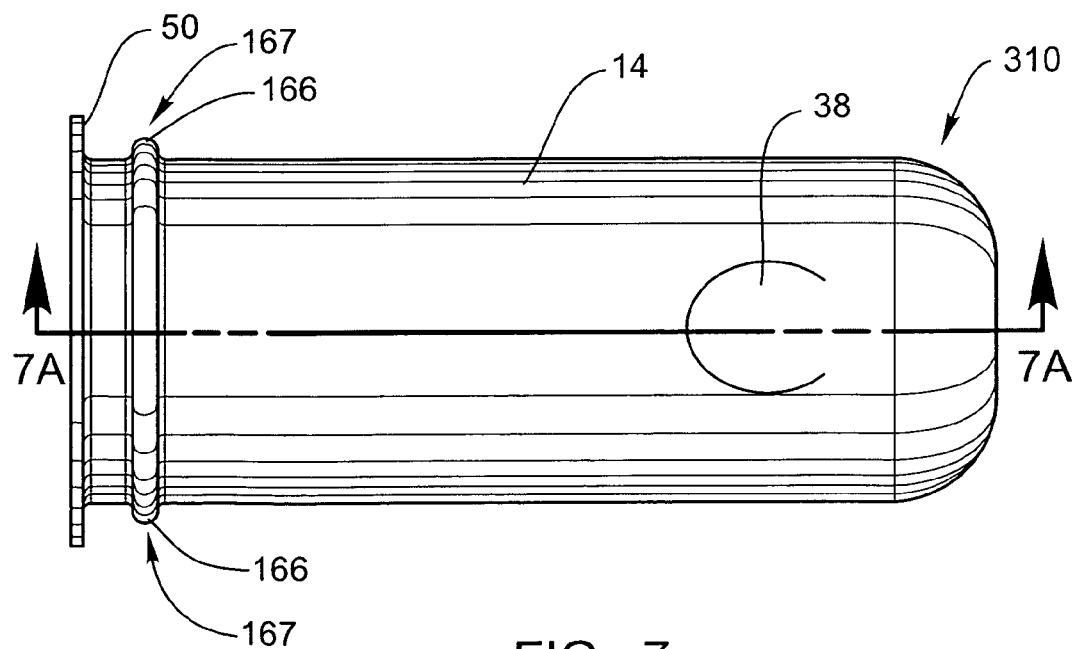
FIG. 7 is a perspective view of another embodiment of a pyrotechnic cup according to the present embodiments.
Figure 7A:
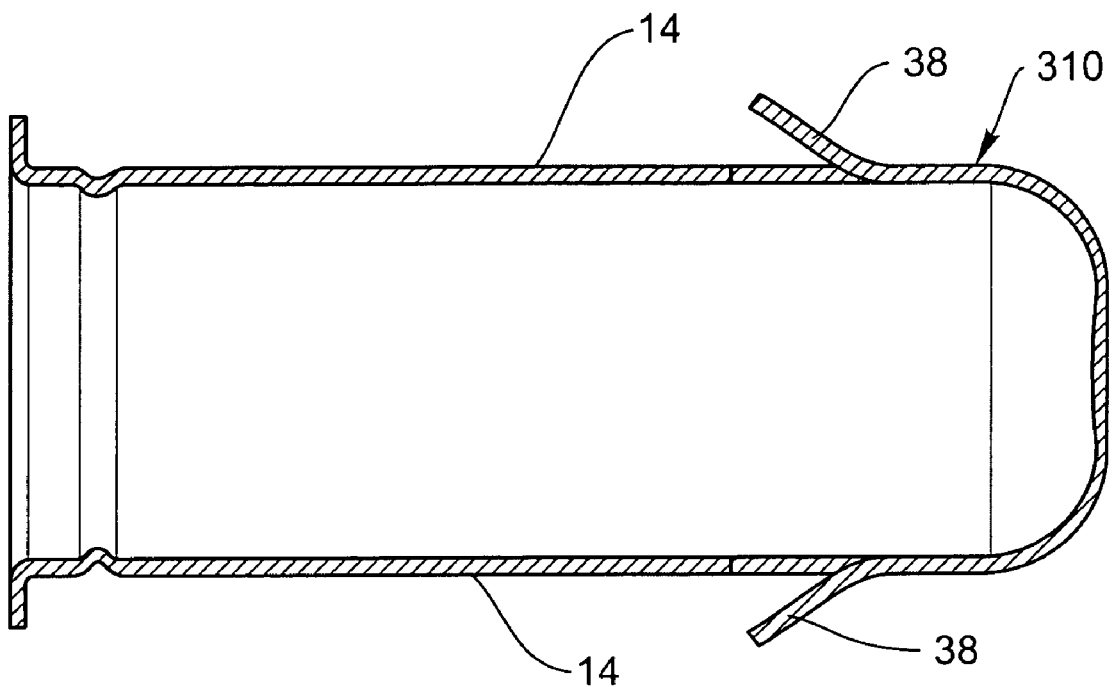
FIG. 7A is a cross-sectional view of the embodiment of FIG. 7.

FIGS. 7 and 7A represent another embodiment of a pyrotechnic cup 310. This cup 310 is similar to that which is described above. Accordingly, for purposes of brevity, only the differences between the cup 310 and the other embodiments will be described herein. With respect to the cup 310, the cruciform 38 is not positioned at the apex of the dome.

Rather, the cruciform is on the cylindrical portion 14. As shown in FIG. 7, only one cruciform 38 is added. However, additional cruciforms 38 may be added around the circumference of the cylindrical portion 14. Further as shown in FIG. 7, the cruciform is not a "star" shape, but rather is simply a tab that may be added. FIG. 7A shows how this tab shaped cruciform 38 may open during deployment.

The embodiment of FIGS. 7 and 7A includes the crimped bend 166 and the overlapped portion 167, as was shown in described in FIGS. 5A and 5B. Those skilled in the art will appreciate that other types of crimped bends, as described herein, may also be used.

Figure 8:
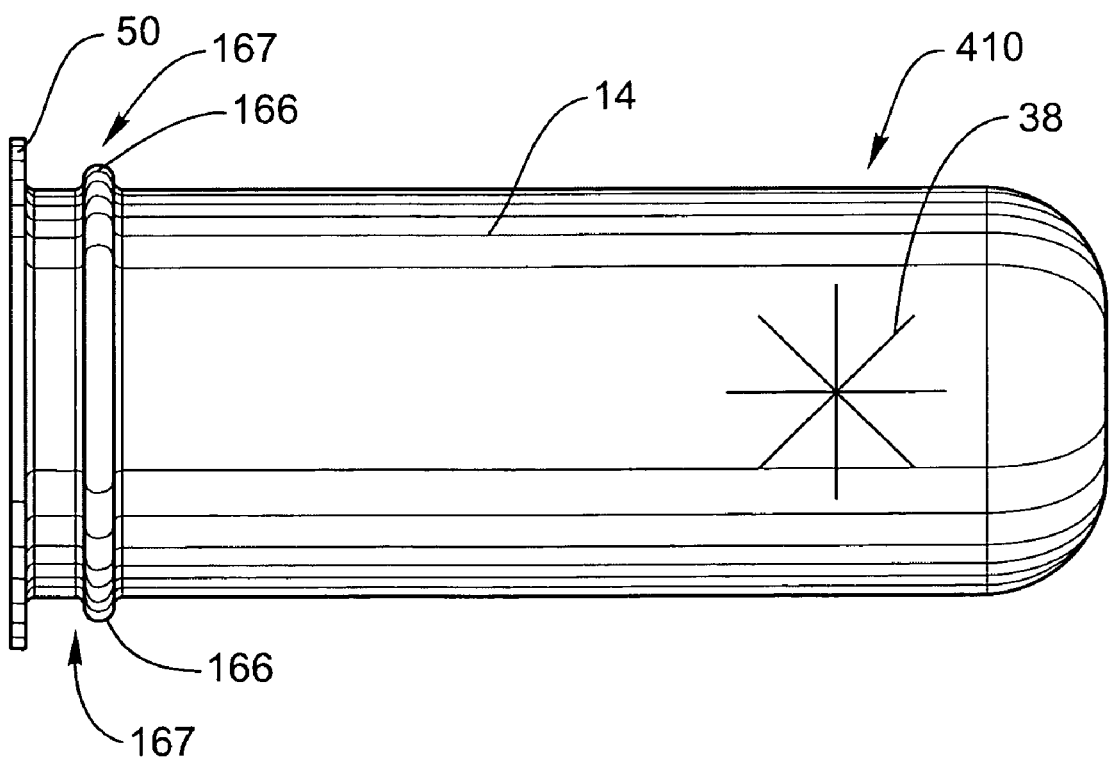
FIG. 8 is a perspective view of another embodiment of a pyrotechnic cup according to the present embodiments.

Referring now to FIG. 8, another embodiment of a pyrotechnic cup 410 is illustrated. The pyrotechnic cup 410 is similar to the embodiments shown above. More specifically, the cup 410 is similar to the cup 310 of FIG. 7 and includes a crimped bend 166 and an overlapped portion 167. However, other types of crimped bends may also be used. The cup 410 includes a cruciform 38 that is positioned on the cylindrical portion 14. More than one cruciform 38 may be added around the circumference of the cylindrical portion 14. The cruciform 38 is star-shaped, like other embodiments heretofore described.

Figure 9:
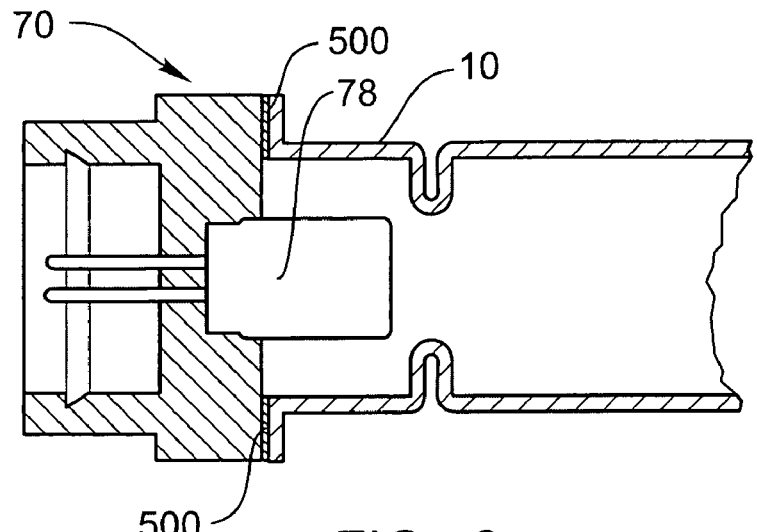
FIGS. 9 through 11 are cross-sectional view which illustrate the way in which the pyrotechnic cups of the present embodiments may be attached.
Figure 10:
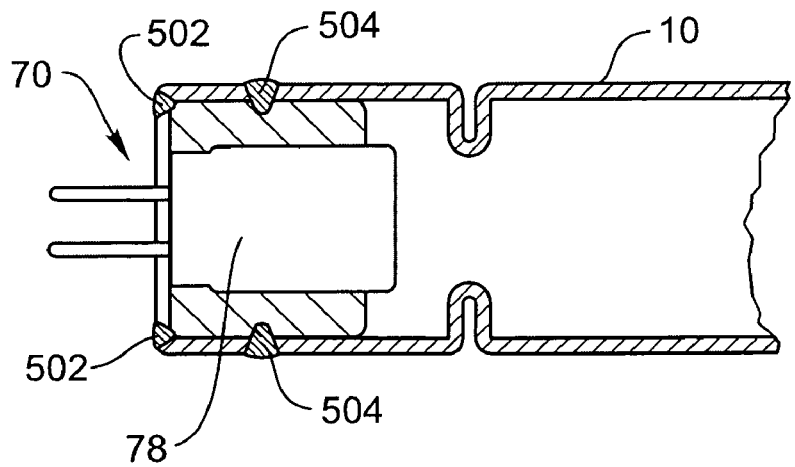
Figure 11:
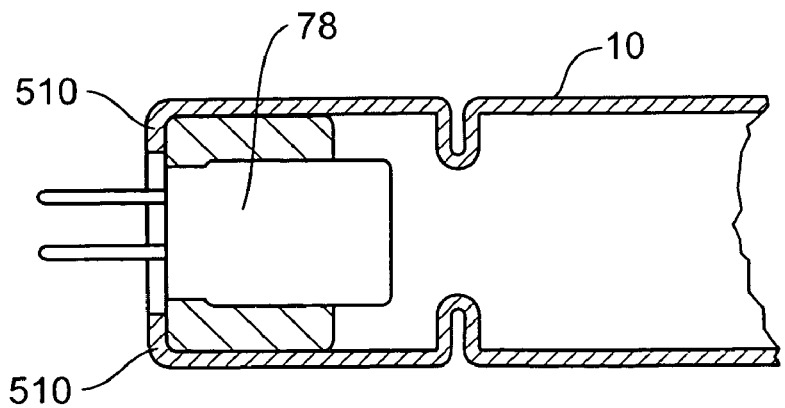

Referring now to FIGS. 9 through 11, a different aspect of the present embodiments will now be described. Specifically, FIGS. 9 through 11 illustrate different ways in which the cup 10 of FIG. 2 may be attached to the initiator 70 and/or squib 78. Although the depiction in FIGS. 9 through 11 is made with respect to the pyrotechnic cup 10 of FIG. 2, those skilled in the art will appreciate that the attachment mechanisms shown in FIGS. 9 through 11 may equally be applied to the other embodiments of the pyrotechnic cups discussed herein. As shown in FIG. 9, the cup 10 may be welded, such as resistance welded, to the initiator 70 and/or the squib 78. This resistance weld is shown by element 500. In FIG. 10, the pyrotechnic cup 10 is welded to the initiator 70 and/or the squib 78 via a lapweld (which is sometimes referred to as a lapweld transparence weld). This weld may be added at the butt 502 and the side 504 of the initiator 70 and/or the squib 78. Other types of welds or welding techniques may also be used. In FIG. 11, the pyrotechnic cup 10 is attached by crimping or welding (via any of the known types of welding techniques) the ends 510 of the cup 10 around all or a portion of the initiator 70 and/or the squib 78. Those skilled in the art will appreciate that any number of techniques may be used for attaching the pyrotechnic cup to the initiator 70 and/or the squib 78. Those shown in FIGS. 9 through 11 are given only as exemplary of the different types of methods that may be used.

Referring now to all of the Figures, the present embodiments also relate to a method for preventing fragmentation of a pyrotechnic cup in an inflator. The method may include the step of obtaining a pyrotechnic cup 10, 110, 210 or any of the other cups described herein. This pyrotechnic cup comprises a cylindrical portion 14, a dome 18 attached to a first end 22 of the cylindrical portion 14, and a cruciform 38 positioned at the apex 42 of the dome 18. The method also includes the step of positioning the cup 10 around a squib 78 and a combustible material 82. Once positioned, the dome prevents fragmentation of the cup.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A pyrotechnic cup designed for use as part of an initiator, the cup comprising:
    a cylindrical portion, the cylindrical portion including a crimped bend configured to unfold without rupturing at the crimped bend during deployment of the initiator;
    a dome having a top piece with an apex and a tapered portion, the tapered portion of the dome being disposed between a first end of the cylindrical portion and the top piece; and
    a cruciform, at least a portion of the cruciform being positioned on a portion of the cylindrical portion, the cruciform configured to open during deployment of the initiator.

2. A pyrotechnic cup as in claim 1 wherein the cruciform defines one or more petals.

3. A pyrotechnic cup as in claim 1 wherein the top piece of the dome is substantially flat.

4. A pyrotechnic cup as in claim 1 further comprising a projection welding flange positioned at a second end of the cylindrical portion.

5. A pyrotechnic cup as in claim 4 wherein the diameter of the projection welding flange is greater than the diameter of the cylindrical portion.

6. A pyrotechnic cup as in claim 1 wherein the cup houses a squib and a quantity of combustible material.

7. A pyrotechnic cup as in claim 1, wherein the crimped bend is intermediate of the dome and a projection welding flange that is positioned at a second end of the cylindrical portion.

8. A pyrotechnic cup as in claim 1 wherein upon deployment of the initiator, gas is directed out of the pyrotechnic cup via the apex of the dome.

9. A pyrotechnic cup as in claim 1, wherein the cruciform comprises a weakened area of the cup.

10. A pyrotechnic cup as in claim 1, wherein at least a portion of the cruciform is positioned on the cylindrical portion.

11. A pyrotechnic cup as in claim 1, wherein the crimped bend comprises an overlapped portion that is folded either inwardly or outwardly.

12. A pyrotechnic cup as in claim 1, wherein the overlapped portion unfolds and the cylindrical portion telescopes out from a base during deployment.

13. An initiator for use with an airbag inflator, the initiator comprising:
    a squib;
    a quantity of combustible material, wherein the combustible material is ignited by the squib during deployment;
    a pyrotechnic cup that houses the squib and the combustible material, wherein the cup comprises, a cylindrical portion including a crimped bend, wherein the crimped bend unfolds without rupturing at the crimped bend during deployment of the initiator, a dome attached to a first end of the cylindrical portion, a cruciform having at least a portion of which being positioned on a portion of the pyrotechnic cup other than the top piece, and a projection welding flange positioned at a second end of the cylindrical portion, wherein the projection welding flange attaches the pyrotechnic cup to the squib.

14. A pyrotechnic cup as in claim 13 wherein the crimped bend expands as a result of ignition of the combustible material.

15. A pyrotechnic cup as in claim 13 wherein the diameter of the projection welding flange is greater than the diameter of the cylindrical portion.

16. A pyrotechnic cup as in claim 13, wherein the cruciform comprises a weakened area of the dome.

17. A pyrotechnic cup as in claim 13, wherein the cruciform is positioned on an outer surface of the dome.

18. A method for preventing fragmentation of a pyrotechnic cup in an inflator, the method comprising:
    obtaining a pyrotechnic cup, the cup comprising:
        a cylindrical portion including a crimped bend, wherein the crimped bend unfolds without rupturing at the crimped bend during deployment of the initiator;
        a dome having an apex, the dome attached to a first end of the cylindrical portion; and
        a cruciform positioned at the apex of the dome and extending into the tapered portion of the dome; and
    positioning the cup around a squib and a combustible material, wherein at least one of the dome or the crimped bend prevents fragmentation of the cup.

19. A pyrotechnic cup designed for use as part of an initiator, the cup comprising:
    a cylindrical portion;
    a dome having an apex, the dome attached to a first end of the cylindrical portion;
    a cruciform; and
    a crimped bend that expands without bursting at the crimped bend during deployment of the initiator, wherein the crimped bend is intermediate of the dome and a projection welding flange that is positioned at a second end of the cylindrical portion.

* * * * *